United States Patent
Benisty

(10) Patent No.: US 11,422,828 B2
(45) Date of Patent: *Aug. 23, 2022

(54) INTERLEAVED HOST RESET AND NEXT RE-INITIALIZATION OPERATIONS

(71) Applicant: Western Digital Technologies, Inc., San Jose, CA (US)

(72) Inventor: Shay Benisty, Beer Sheva (IL)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/094,686

(22) Filed: Nov. 10, 2020

(65) Prior Publication Data

US 2021/0109765 A1 Apr. 15, 2021

Related U.S. Application Data

(63) Continuation of application No. 16/600,816, filed on Oct. 14, 2019, now Pat. No. 10,860,333.

(51) Int. Cl.
*G06F 9/4401* (2018.01)
*G06F 13/16* (2006.01)

(52) U.S. Cl.
CPC ........ *G06F 9/4411* (2013.01); *G06F 13/1668* (2013.01)

(58) Field of Classification Search
CPC .................................................... H04L 67/12
See application file for complete search history.

(56) References Cited

U.S. PATENT DOCUMENTS 5,495,606 A 2/1996 Borden et al.
6,256,695 B1 * 7/2001 Williams .............. G06F 3/0614
710/107

(Continued)

FOREIGN PATENT DOCUMENTS

CN 104751889 A 7/2015
KR 10-2017-0012674 A 2/2017

OTHER PUBLICATIONS

International Search Report and Written Opinion issued in corresponding International Patent Application No. PCT/US2020/023406, dated Jul. 8, 2020 (9 pages).

*Primary Examiner* — Henry Tsai
*Assistant Examiner* — Juanito C Borromeo
(74) *Attorney, Agent, or Firm* — Patterson + Sheridan, LLP; Steven H. VerSteeg

(57) ABSTRACT

Embodiments of the present disclosure seek to mitigate the timing issues of prior approaches by performing the NVMe device reset and post-reset re-initialization in parallel. In embodiments, the NVMe device reset and re-initialization operations are logically divided into front-end and back-end operations that may be carried out in parallel. Upon receipt of the command from a host to reset, the NVMe device carries out front-end reset operations for resetting the device, and in parallel performing back-end reinitialization operations. Once the front-end reset operations are complete, or after a predetermined period of time, the NVMe device reports to the host that the device reset is complete, while back-end operations continue. Once all reset and reinitialization operations are complete, the NVMe device may continue to conduct I/O instructions from the host.

20 Claims, 4 Drawing Sheets

(56) References Cited

U.S. PATENT DOCUMENTS

| | | |
|---|---|---|
| 7,349,844 B2 | 3/2008 | Staiger |
| 7,415,568 B2 | 8/2008 | Kawabata et al. |
| 8,719,646 B2 | 5/2014 | He et al. |
| 9,990,023 B2 | 6/2018 | Paley et al. |
| 2012/0004011 A1 | 1/2012 | Chun |
| 2014/0223213 A1 | 8/2014 | Yamazaki et al. |
| 2015/0052317 A1 | 2/2015 | Grunzke |
| 2017/0024139 A1 | 1/2017 | Shim et al. |
| 2017/0168747 A1 | 6/2017 | Han et al. |
| 2018/0349301 A1 | 12/2018 | Canepa |
| 2019/0171385 A1 | 6/2019 | Caraccio et al. |
| 2019/0188153 A1 | 6/2019 | Benisty et al. |

* cited by examiner

INTERLEAVED HOST RESET AND NEXT RE-INITIALIZATION OPERATIONS

CROSS-REFERENCE TO RELATED APPLICATIONS

This application is a continuation of U.S. patent application Ser. No. 16/600,816, filed Oct. 14, 2019, which is herein incorporated by reference.

BACKGROUND OF THE DISCLOSURE

Field of the Disclosure

Embodiments of the present disclosure generally relate to the administration of a data storage, and more particularly to reset of an NVMe device.

Description of the Related Art

During the operation of a host system containing a non-volatile memory express (NVMe) data storage device, occasionally the NVMe is required to undergo a reset operation.

There are two main phases that make up such a reset operation. The first is the device reset handling. During reset handling, a number of operations are carried out, including but not limited to cessation of currently outstanding administrative or I/O processes, deletion of I/O submission and completion queues, transition of the NVMe controller is brought to an idle state, flush of all cached data to the NAND, and an update to FTL tables in preparation for the next operation.

Once the reset operations are completed, the NVMe device is reinitialized, the second phase of NVMe device reset begins. The device is reinitialized by the host with a number of operations such as update to register state, configuration of the NVMe controller, creation of I/O completion and submission queues, and once these are complete, continuation of normal I/O operation of the NVMe.

However, the reset and re-initialization processes are typically carried out in serial. Because it is not known how long the reset and/or re-initialization phases may take, it is unknown how long the entire process will take. Because this time is unknown, the NVMe reset process, followed by re-initialization, may not meet standards based expectations of a host system. Such standards may include NVMe, PCIe, and/or other standards for the utilization of memory hardware.

What is needed is a system and method to reset an NVMe device in a manner that is more predictable in terms of time and compliant with standards.

SUMMARY OF THE DISCLOSURE

Embodiments of the present disclosure seek to mitigate the timing issues of prior approaches by performing NVMe, PCIe, or other device reset and post-reset re-initialization in parallel. In embodiments, the NVMe device reset and re-initialization operations are logically divided into front-end and back-end operations that may be carried out in parallel. Upon receipt of the command from a host to reset, the NVMe device carries out front-end reset operations for resetting the device, and in parallel performing back-end reinitialization operations. Once the front-end reset operations are complete, or after a predetermined period of time, the NVMe device reports to the host that the device reset is complete, while back-end operations continue. Once all reset and reinitialization operations are complete, the NVMe device may continue to conduct I/O instructions from the host.

In one embodiment, a data storage device is disclosed. In embodiments, the data storage device may include a controller comprising instructions that, when executed by a processor, cause the controller to perform a method of resetting the data storage device. In embodiments, the method comprises logically separating a set of front-end reset tasks from a set of back-end reset tasks, receiving a reset command from a host system, performing the set of front-end reset tasks and set of back-end reset tasks in parallel upon receipt of the reset command. The method may further comprise transmitting a reset complete signal to the host system upon completion of the set of front-end reset tasks, and transmitting a storage device ready signal to the host system that indicates that the storage device is in a condition to receive a command from the host system. In embodiments, the method may further comprise receiving a command from the host system and executing the command when the set of back-end reset tasks are complete.

In another embodiment, a data storage system is disclosed. The data storage system, in embodiments, includes an interface configured to receive reset instructions from a host, a front-end module configured to carry out front-end reset operations, and a back-end module configured to carry out back-end reset operations. This system may further comprise a reset handler module configured to logically separate the front-end module from the back-end module, wherein the front-end reset operations and back-end reset operations are carried out in parallel, and the reset handler module is configured to communicate with the host that reset operations are complete upon completion of front-end operations.

In another embodiment, a data storage system is disclosed comprising a controller that includes a processor for executing computer instructions to reset the data storage system. In embodiments, the controller may include a front-end module configured to carry out front-end reset operations, a back-end module configured to carry out back-end reset operations, and a means for logically separating the front-end reset operations from the back-end reset operations, such that the front-end reset operations and back-end reset operations are carried out in parallel.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Embodiments of the present disclosure seek to mitigate the timing issues of prior approaches by performing the NVMe device reset and post-reset re-initialization in parallel. In embodiments, the NVMe device reset and re-initialization operations are logically divided. Reset operations are divided into front-end and back-end operations, with back-end reset operations being carried out in parallel with reinitialization operations. Upon receipt of the command from a host to reset, the NVMe device carries out front-end reset operations for resetting the device. Once the front-end reset operations are complete, or after a predetermined period of time, the NVMe device reports to the host that the device reset is complete, while device reinitialization and back-end reset operations continue. Once all reset and reinitialization operations are complete, the NVMe device may continue to conduct I/O instructions from the host.

Figure 1:
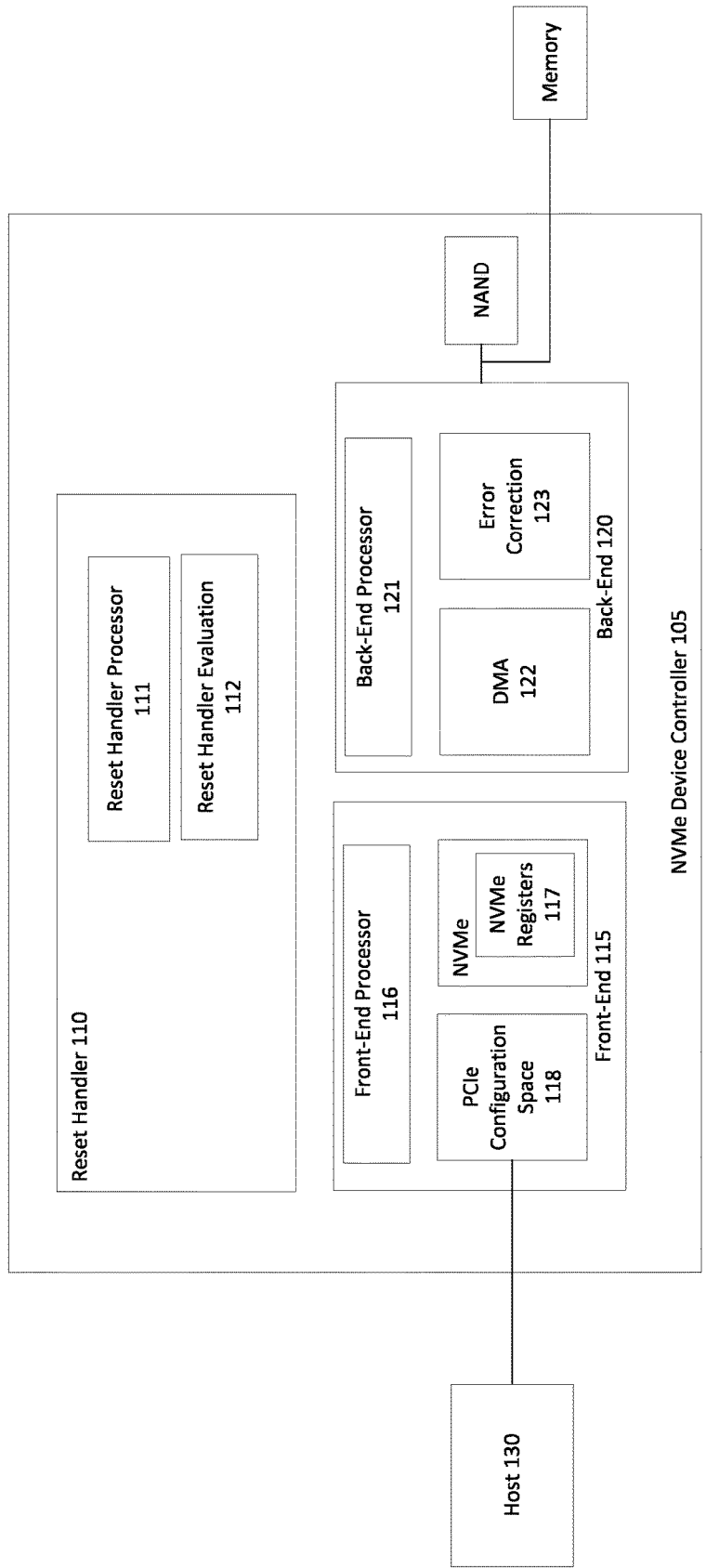
FIG. 1 depicts an NVMe device in accordance with one or more embodiments.

FIG. 1 depicts an exemplary NVMe device 100. The NVMe device 100 may be any type of non-volatile memory storage device, however embodiments disclosed herein may be applicable to other types of data storage devices. Suitable means for NVMe device 100 includes solid-state drives (SSD), and may include other storage devices that utilize non-volatile and/or volatile memory.

NVMe device 100 includes an NVMe device controller 105 in accordance with embodiments. NVMe device controller 105 includes a reset handler 110. Reset handler 110 includes a reset handler processor 111 and instructions capable of managing reset operations for the NVMe device controller 105. Suitable means for the management of reset operations may be implemented in hardware, firmware, software, or other medium capable of storing instructions that may be read by the reset handler 110. Reset handler 110 in some embodiments further includes reset handler evaluation 112, for evaluating time to report reset complete to a host 130.

Reset handler 110 communicates with a front-end 115 and a back-end 120. In addition to controlling the operations of the front-end 115 and back-end 120, the reset handler 110 serves to functionally and/or logically separate the functioning of each of these components. As discussed below, front-end 115 is configured to carry out reset operations as well as device reinitialization operations. Reset handler 110 in embodiments is configured to logically separate these functions of the front-end 115 as well. Logical separation in embodiments may be carried out at the architecture level of the NVMe device 100.

Front-end 115 includes a front-end processor 116 as well as a number of registers such as NVMe registers 117, and in some embodiments may include PCI configuration space 118. Front-end 115 includes components responsible for interaction with the host 130, such as PCIe, PHY, MAC, NVMe, and processors such as front-end processor 116. Front-end 115 may be configured to carry out a number of reset operations, including cessation of currently outstanding administrative or I/O processes, deletion of I/O submission and completion queues, transition of the NVMe controller is brought to an idle state, flush of all cached data to the NAND, update to FTL tables in preparation for the next operation, cleaning up internal database tables (e.g. collision tables), resetting all status and configuration registers, cleaning the data path, and the like. In embodiments, front-end 115 is configured to reinitialize the NVMe device 100. Reinitialization in embodiments includes, and is not limited to, re-establishing the link to the a host coupled to NVMe device 100, PCIe enumeration and initialization, NVMe register reinitialization, recreation of NVMe queues, and MSI-X table initialization.

Back-end 120 includes a back-end processor 121, and components that integrate modules responsible for interactions with memories such as DMA 122, as well as components that ensure data integrity such as error correction 123. Back-end 120 in embodiments includes connections to one or more NANDs and one or more memories (e.g. DDR memory), that may be accessed during back-end reset operations. Back-end 120 is configured to carry out reset operations such as flushing all cache data to the NAND, updating tables in the NAND, cleaning the internal databases, resetting all status and configuration registers, and other background operations.

The host 130 utilizes the NVMe device 100 controlled by the NVMe device controller 105 in the execution of I/O operations. The host 130 may be any type of compute system capable of using NVMe device 100. Suitable means for a host include a portable compute device, a desktop/workstation computer, a distributed compute system, a virtualized compute system, or any type of compute system capable of using NVMe device 100.

Upon receiving a reset command, in some embodiments the NVMe device controller 105 evaluates via reset handler evaluation 112 of the reset handler 110, when to notify the host 130 that the reset is complete and normal I/O operations may continue. Suitable means for evaluation for timing of notification of the host 130 is based on parameters such as number of pending commands in the device, current cache buffer size, NAND state, pending background operations, dirty entries in an FTL table to be flushed to the NAND, and the like, that should be completed in the front-end 115 during the reset, as well as estimated time for reset and re-initialization. It should be noted that the time for notifying the host may be determined to be at a time prior to initiation of re-initialization operations and to the back-end 120 completing its reset operations.

In other embodiments the reset handler 110 doesn't evaluate a particular time to notify the host 130, and instead generates a signal to notify the host 130 that the reset is complete when front-end 115 has completed its reset operations, prior to start of re-initialization operations and completion of back-end 120 operations.

NVMe device controller 105 is depicted in FIG. 1 as having a number of discrete processors, such as front-end processor 116, back-end processor 121, and controller processor 140. However, suitable means for one or more of these processor may be as a single processor, multiple processors, or one or more processors located remotely from NVMe device controller 105 or NVMe device 100.

Figure 2:
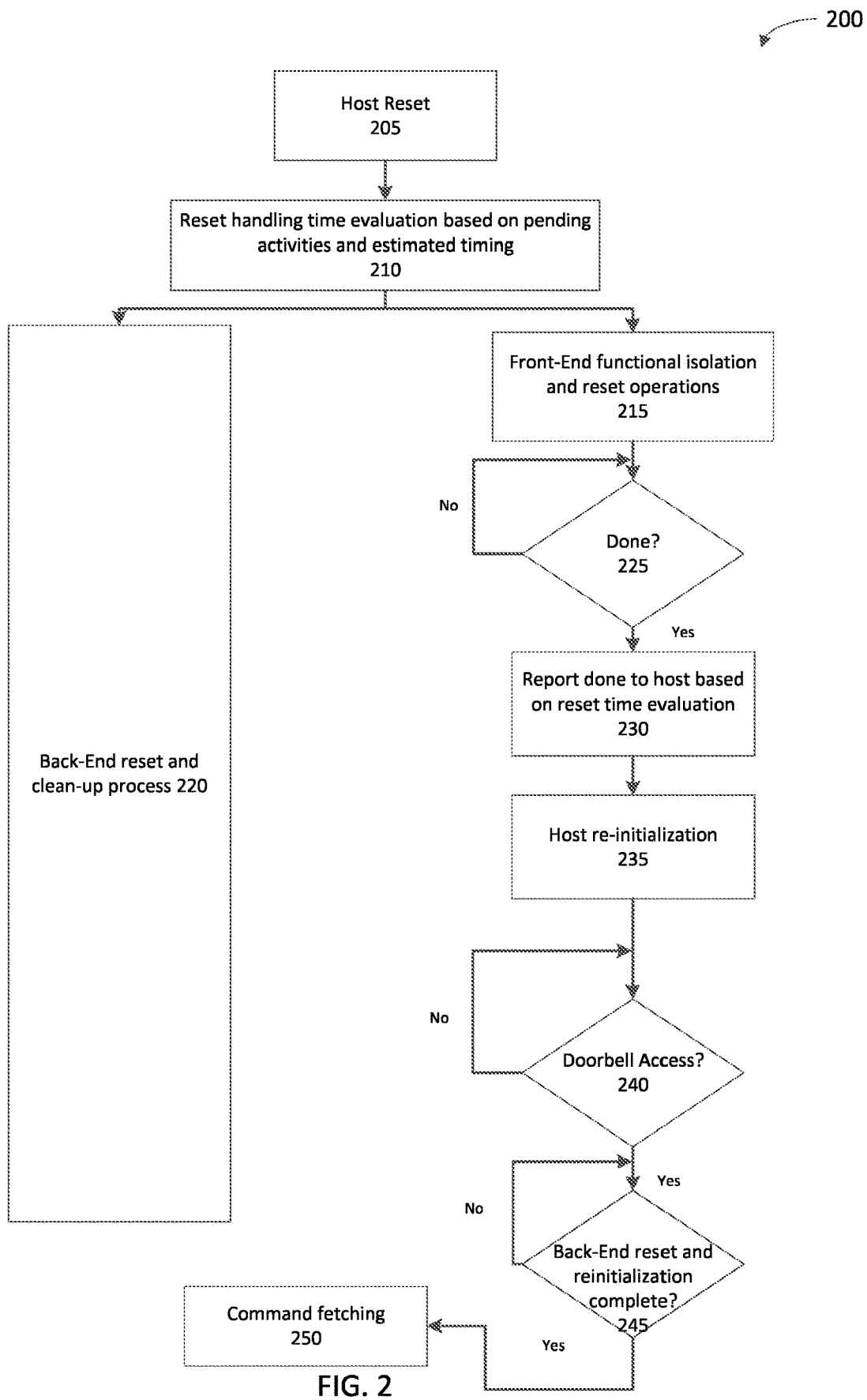
FIG. 2 depicts a flow diagram describing an interleaved NVMe reset and re-initialization in accordance with one or more embodiments.

FIG. 2 depicts a flow diagram 200 describing an interleaved NVMe reset and re-initialization in accordance with embodiments of the disclosure. At 205, a reset command is issued. In some embodiments, the host 130, or other device outside of NVMe device 100, may issue the reset command, while in other embodiments the NVMe device controller 105 may issue the reset command.

At 210 reset handling time evaluation is carried out to determine a host reset complete notification time based on pending activities in the front-end 115 that need to be completed, and estimated timing required for reset and reinitialization. The result of this evaluation may be used by the NVMe device controller 105 to determine when to report that the reset is complete to the host 130, while in parallel the NVMe device 100 begins reinitialization and continues to process back-end reset operations. In an alternate embodiment, reset handling time evaluation is not carried out, and instead a reset complete signal is provided to the host 130 when the front-end 115 has completed its reset operations, before reinitialization operations are initiated, and in embodiments, before completion of back-end 120 reset operations.

At 215, front-end 115, which has had its reset handling operations logically isolated from its reinitialization operations, and functionally isolated from the back-end 120, carries out front-end reset handling operations.

At 220, and in parallel with step 215, back-end 120, functionally isolated from front-end 115, carries out back-end reset handling operations.

At 225, a determination is made as to whether or not front-end 115 has completed front-end reset handling operations. If not, the 'no' path is followed to allow front-end 115 to complete front-end reset handling operations. If the front-end reset handling operations are complete, the process continues to 230. In embodiments, this occurs in parallel with the back-end 120 carrying out back-end reset handling operations.

At 230, a report is made to host 130 based on the reset evaluation. NVMe device controller 105, once host reset notification time has been reached, sends a signal to the host indicating that the reset is complete. This will occur even if back-end reset operations are not complete and will signal the start of reinitialization operations on the front-end 115; these operations will continue in parallel.

In an alternate embodiment in which a host reset notification time has not been determined, the NVMe device controller 105 will send a signal to the host that the reset is complete once the front-end 115 reset operations are complete. This will occur whether or not the back-end reset operations are complete, and initiate reinitialization operations.

At 235 the host 130 reinitializes the NVMe device 100. This may occur in parallel with back-end reset operations of step 220 and reinitialization operations initiated at 230.

At 240, the host issues a doorbell write to an I/O submission queue indicating that an I/O command is pending.

At 245 NVMe controller 105 determines if back-end reset operations of step 220 are complete. If not, the back-end reset operations will continue and no commands will be fetched. If back-end reset operations and reinitialization are complete, the process proceeds to step 250 in which commands from host 130 may be fetched and processed. In an alternate embodiment, commands may be fetched from the host 130 before completing back-end reset operations. In such an embodiment, the front-end 115 will not sent any notification to the back-end 120 before all reset operations, including reinitialization, are complete.

At 250, the NVMe device 100 fetches commands from the host 130 for execution.

Figure 3:
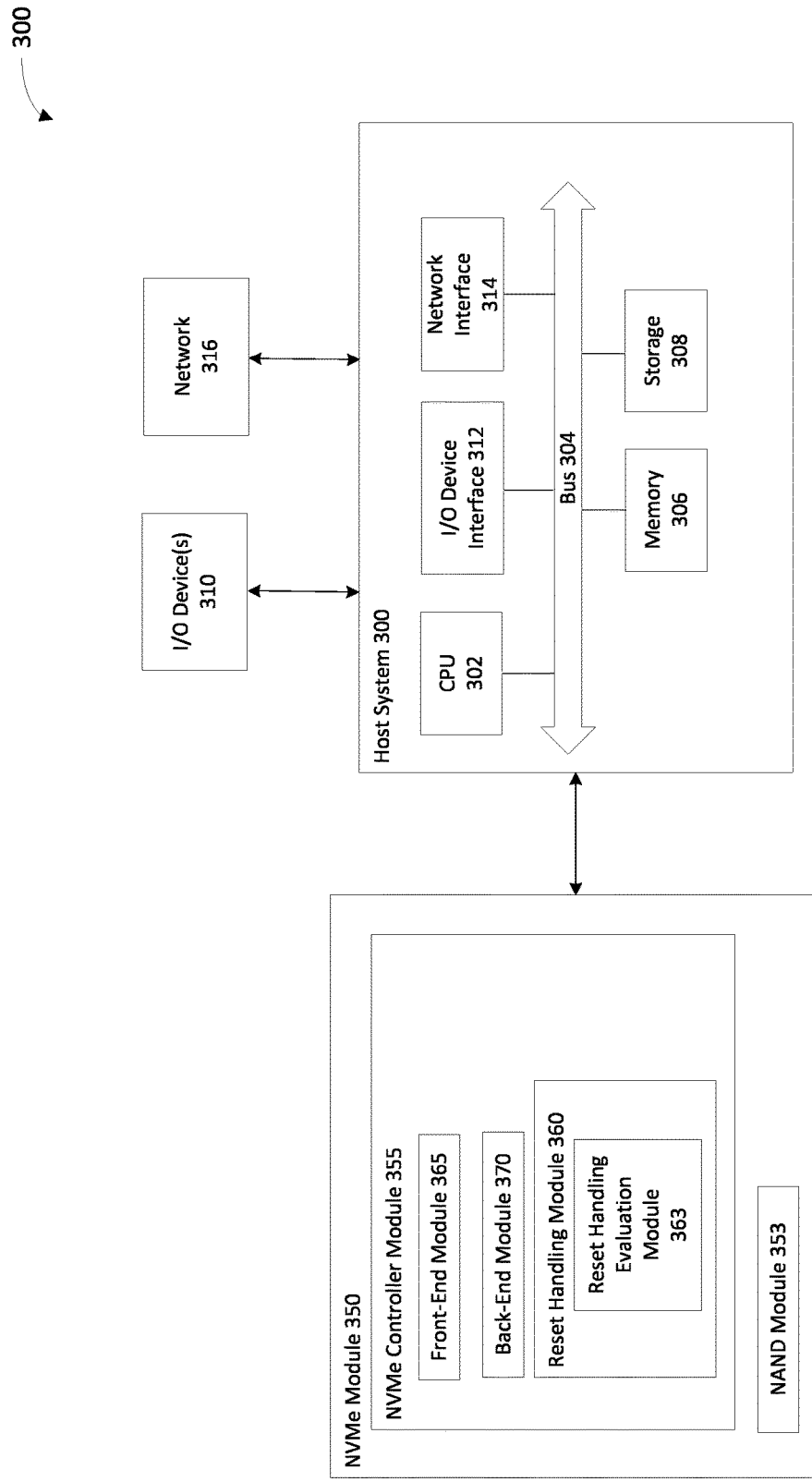
FIG. 3 depicts an exemplary processing system for interleaved resetting and reinitializing of an NVMe device, in accordance with one or more embodiments.

FIG. 3 depicts an exemplary host system in which disclosed embodiments may be integrated and perform methods described herein, with respect to FIGS. 1 and 2.

Host System 300 includes a central processing unit (CPU) 302 connected to data bus 304. CPU 302 is capable of processing computer-executable instructions, such as may be stored for example, in memory 306 or storage 308 that may include NVMe module 350 to perform the methods described herein, for example with respect to FIGS. 1 and 2. In embodiments, host system 300 may be similar to aforementioned host 130.

Suitable means for memory 306 may be a single physical memory, multiple memories, as well as one or more memories located remotely from the host system 300 and accessed via a network. Similarly suitable means for storage 308 may be one or more physical storage devices may be utilized, and one or more physical storage devices may be located remotely from host system 300 and accessed via a network. One such physical storage device that comprises storage 308, in some embodiments, is NVMe module 350.

Suitable means for CPU 302 in embodiments may be a single CPU, multiple CPU's, a single CPU having multiple cores, one or more CPU's located remotely from host system 300, one or more virtualized CPU's, or other forms of processing architecture capable of executing computer-readable instructions.

Host system 300 further includes, in embodiments, input/output (I/O) device(s) 310 and I/O device interface(s) 312, allowing host system 300 to interface I/O devices 310, such as for example, keyboards, displays, mouse devices, pens, and other devices that allow for interaction with host system 300. Note that host system 300 may connect with external I/O devices through physical and wireless connections.

Host system 300 may further include a network interface 314, to provide host system 300 with access to external network 316 and concomitantly, external computing devices, components, and services.

Host system 300 further includes NVMe module 350, which in this example includes an NVMe controller module 355 and a NAND module 353, a reset handling module 360, a reset handling evaluation module 363, a front-end module 365 that is functionally and/or logically separate from a back-end module 370, for performing operations described in connection with FIGS. 1 and 2.

Figure 4:
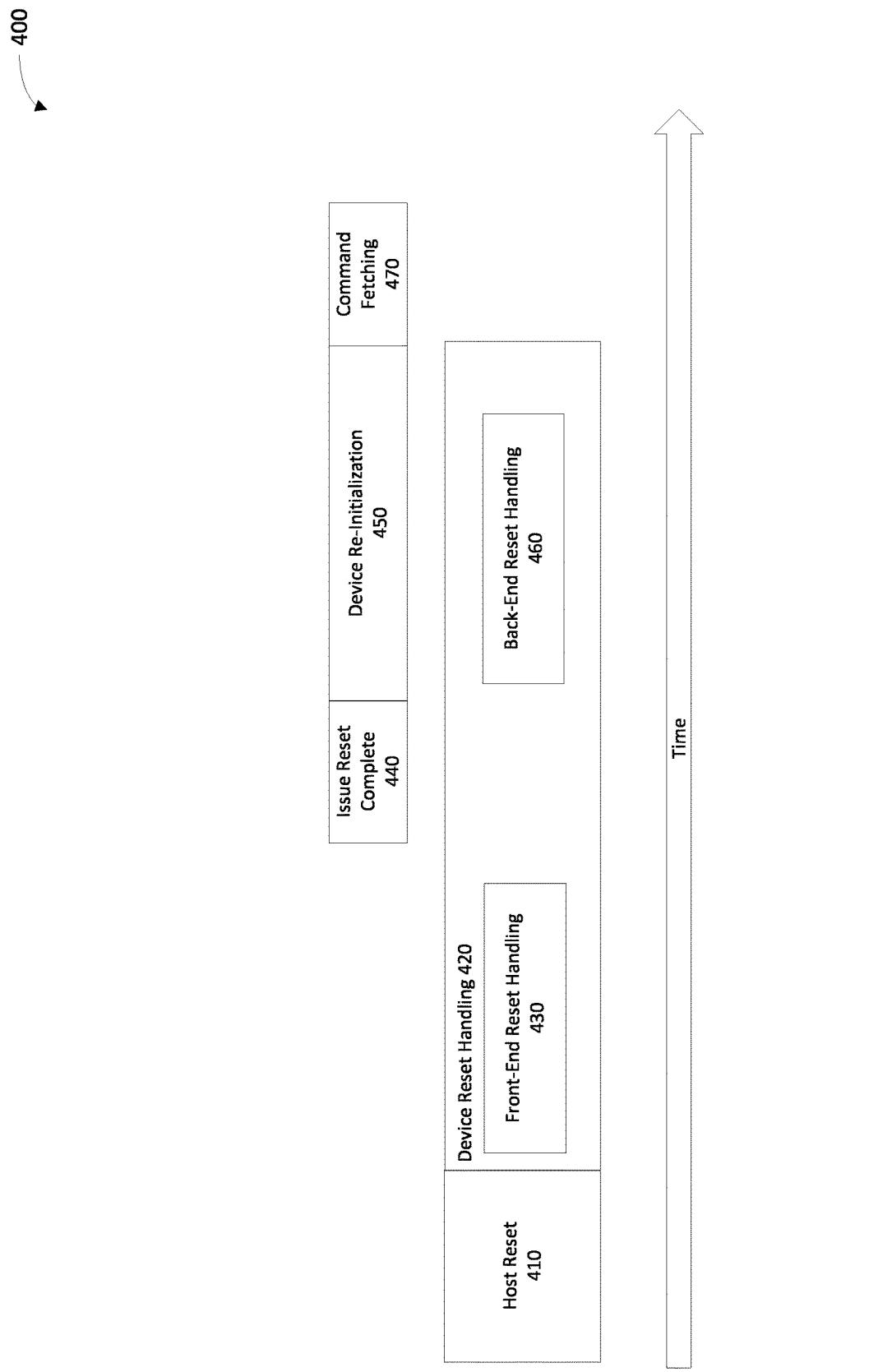
FIG. 4 depicts an exemplary timing diagram in accordance with disclosed embodiments.

FIG. 4 depicts a timing diagram 400 in accordance with embodiments of the disclosure.

At 410 a reset is issued to the NVMe device 100. The reset 410 may be issued by a host 130, or by the NVMe device 100 itself.

At 420, device reset handling is initiated by reset handler 110, logically dividing reset operations of the front-end 115, back-end 120, and reinitialization. At 430, front-end reset handling is initiated, and once complete, at 440 the reset handler 110 provides an issue reset complete to the host 130.

At 450 NVMe device 100 reinitialization commences, in parallel with back-end reset handling 460.

I/O Command fetching 470 from the host may occur at any time prior to completion of either or both of back-end reset handling 460 and device re-initialization 450. Commands fetched prior to completion of either of these will cause the front-end 115 to hold the commands until back-end reset handling 460 and device reinitialization 450 are completed.

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented, or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and other circuit elements that are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates the transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During the execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein but are to be accorded the full scope consistent with the language of the claims. Within a claim, a reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

In following the systems and methods disclosed herein, timing of a reset of an NVMe device may become more predictable, enabling operations with in a host to proceed in an efficient manner.

In one embodiment, a data storage device is disclosed. In embodiments, the data storage device may include a controller comprising instructions that, when executed by a processor, cause the controller to perform a method of resetting the data storage device. In embodiments, the method comprises logically separating a set of front-end reset tasks from a set of back-end reset tasks, receiving a reset command from a host system, performing the set of front-end reset tasks and set of back-end reset tasks in parallel upon receipt of the reset command. The method may further comprise transmitting a reset complete signal to the host system upon completion of the set of front-end reset tasks, and transmitting a storage device ready signal to the host system that indicates that the storage device is in a condition to receive a command from the host system. In embodiments, the method may further comprise receiving a command from the host system and executing the command when the set of back-end reset tasks are complete.

In another embodiment, a data storage system is disclosed. The data storage system, in embodiments, includes an interface configured to receive reset instructions from a host, a front-end module configured to carry out front-end reset operations, and a back-end module configured to carry out back-end reset operations. This system may further comprise a reset handler module configured to logically separate the front-end module from the back-end module, wherein the front-end reset operations and back-end reset operations are carried out in parallel, and the reset handler module is configured to communicate with the host that reset operations are complete upon completion of front-end operations.

In another embodiment, a data storage system is disclosed comprising a controller that includes a processor for executing computer instructions to reset the data storage system. In embodiments, the controller may include a front-end module configured to carry out front-end reset operations, a back-end module configured to carry out back-end reset operations, and a means for logically separating the front-end reset operations from the back-end reset operations, such that the front-end reset operations and back-end reset operations are carried out in parallel.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
a controller comprising instructions that, when executed by a processor, cause the controller to perform a method of resetting the data storage device, the method comprising:
performing a set of front-end reset tasks and a set of back-end reset tasks in parallel upon receipt of a reset command;
transmitting a reset complete signal to a host system upon completion of the set of front-end reset tasks;
receiving a command from the host system; and
executing the command when the set of back-end reset tasks are complete.

2. The data storage device of claim 1, wherein the set of back-end reset tasks are not complete when the reset complete signal is transmitted.

3. The data storage device of claim 1, further comprising re-initialization of the storage device by the host system after transmitting the reset complete signal to the host system.

4. The data storage device of claim 1, wherein a storage device ready signal is transmitted to the host system after a delay time.

5. The data storage device of claim 4, wherein the delay time comprises estimating with a processor, a time to complete one of the front-end reset tasks and the back-end reset tasks.

6. The data storage device of claim 5, wherein the delay time comprises estimating with a processor, a time to complete both of the front-end reset tasks and back-end reset tasks.

7. The data storage device of claim 1, wherein the set of front-end reset tasks comprises one of resetting a register and resetting a queue, and the set of back-end reset tasks comprises writing to one of a NAND and a memory.

8. A data storage system, comprising:
a reset handler module configured to logically separate a front-end module from a back-end module, wherein front-end reset operations and back-end reset operations are carried out in parallel, and wherein the reset handler module configured to communicate with a host that reset operations are complete upon completion of front-end reset operations.

9. The data storage system of claim 8, further comprising a reset handler evaluation module configured to determine a reset-complete notification time to provide to a host.

10. The data storage system of claim 9, wherein the reset-complete notification time is determined to be less than the time required to carry out back-end reset operations.

11. The data storage system of claim 9, wherein the reset-complete notification time is less than the time required to carry out back-end reset operations and front-end reset operations.

12. The data storage system of claim 9, wherein the reset handler evaluation module is configured to determine the reset-complete notification time based at least on part on the completion of one of the front-end reset operations and back-end reset operations.

13. The data storage system of claim 9, wherein the reset handler evaluation module is configured to determine the reset-complete notification time based at least in part on the completion of both of the front-end reset operations and back-end reset operations.

14. The data storage system of claim 11, wherein at least one of the front-end reset operations used to determine the reset-complete notification time is pending activities in the data storage system at a time reset instructions are received from the host.

15. The data storage system of claim 8, wherein the reset handler module communicates with a host that reset operations are complete prior to the completion of back-end reset operations.

16. The data storage system of claim 15, wherein the data storage system is configured to provide doorbell access to the host prior to the completion of back-end reset operations.

17. The data storage system of claim 16, wherein the data storage system is configured to not fetch commands from the host until back-end reset operations are complete.

18. A data storage system, comprising:
 means for logically separating front-end reset operations from back-end reset operations; and
 means for executing the front-end reset operations and back-end reset operations in parallel.

19. The data storage system of claim 18, further comprising means for notifying a host that at least one of the front-end reset operations and back-end reset operations is complete.

20. The data storage system of claim 19, configured such that one of the front-end reset operations and back-end reset operations is not complete after notifying the host.

\* \* \* \* \*